(No Model.) 2 Sheets—Sheet 1.

J. A. McDONALD.
BEARING ROLLER FOR BRIDGES, &c.

No. 327,808. Patented Oct. 6, 1885.

Witnesses:
Samuel Owen Edmonds
W. E. Boulter

Inventor:
John A. McDonald
Henry Orth
his atty (No Model.) 2 Sheets—Sheet 2.
J. A. McDONALD.
BEARING ROLLER FOR BRIDGES, &c.
No. 327,808. Patented Oct. 6, 1885.
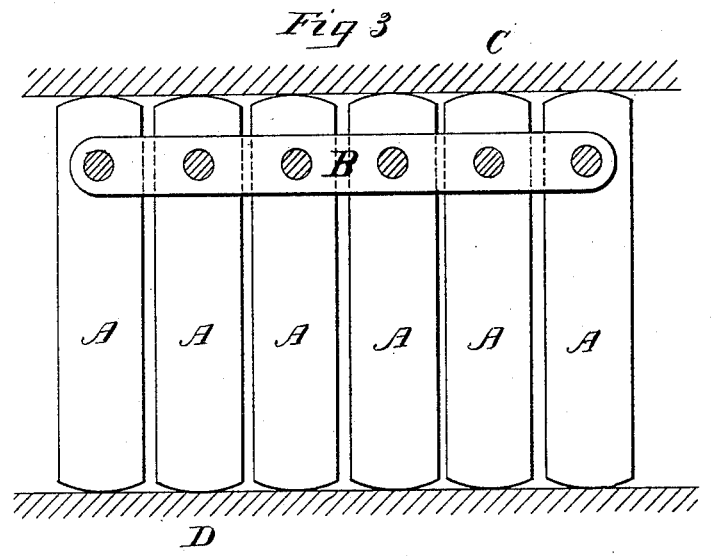
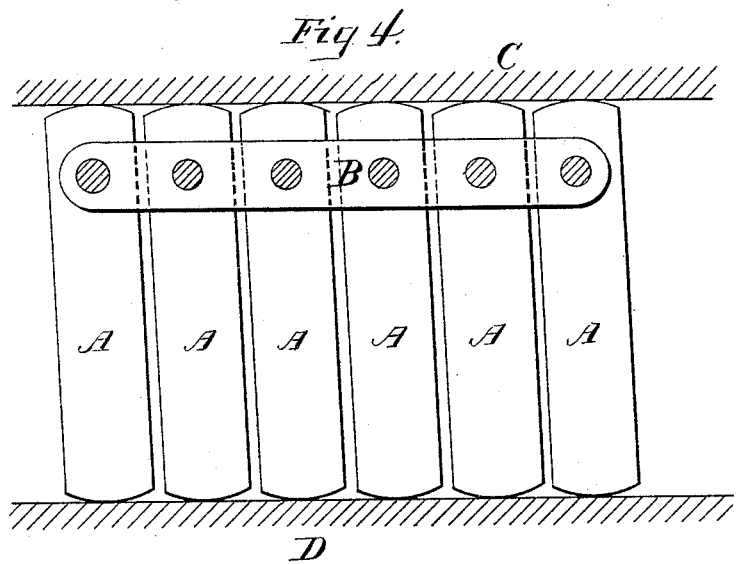

United States Patent Office.

JOHN A. McDONALD, OF SYDNEY, NEW SOUTH WALES.

BEARING-ROLLER FOR BRIDGES, &c.

SPECIFICATION forming part of Letters Patent No. 327,808, dated October 6, 1885.

Application filed October 16, 1884. Serial No. 145,678. (No model.) Patented in South Australia August 22, 1884, No. 480; in Victoria August 28, 1884, No. 3,824; in New South Wales October 6, 1884, No. 10,328; in England October 18, 1884, No. 13,783, and in Queensland November 17, 1884, No. 7.

*To all whom it may concern:*

Be it known that I, JOHN A. McDONALD, a subject of the Queen of Great Britain, residing at Sydney, in the British Colony of New South Wales, have invented certain new and useful Improvements in Bearing-Rollers for Bridges and other Structures, (for which I have obtained Letters Patent in Victoria, No. 3,824, dated August 28, 1884; in South Australia, No. 480, dated August 22, 1884; in New South Wales, No. 10,328, dated October 6, 1884; in Queensland, No. 7, dated November 17, 1884, and in England, No. 13,783, dated October 18, 1884,) of which the following is a full, clear, and exact description.

It is customary to place bearing-rollers between the superstructure and the foundations of bridges, arches, viaducts, aqueducts, pipes, and other structures, so as to allow such structures to expand and contract at changes of temperature, or from other causes. Now, my invention has been devised so that such bearing-rollers may have a much larger diameter, and yet at the same time take up no larger or very little larger space on the bearing-plate relatively than the rollers hitherto used.

My improvements in bearing-rollers for bridges and other structures consist in their peculiar construction and in connecting two or more of them in series.

The peculiar construction of my bearing-rollers is that of a flat or parallel portion of a cylinder about its diameter; or, in other words, a cross-section of the roller shows a portion of a circle from which two equal and parallel segments have been taken. When a large bearing-surface is required, I use two or more of these rollers connected together by a link or links, so that each one in the series shall have the same movement.

But in order that my invention may be clearly understood, reference will now be made to the drawings herewith, in which—

Figure 2:
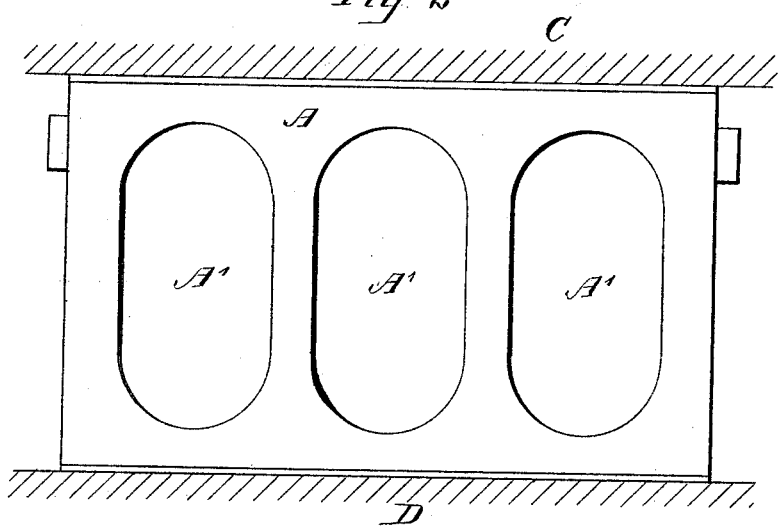
Figure 1:
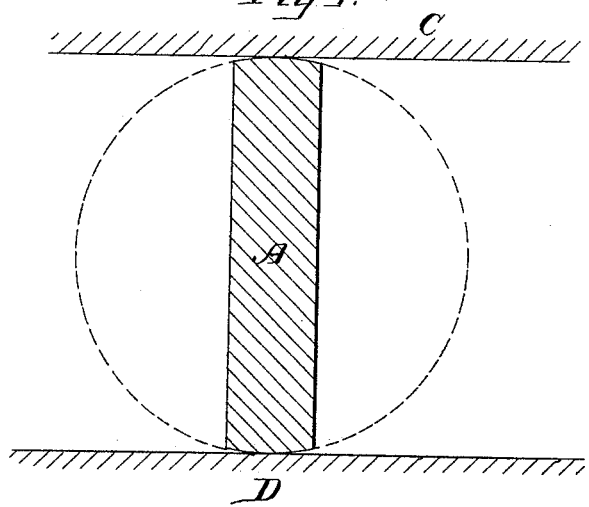

Figure 1 shows a cross-section of one of my rollers; Fig. 2, side elevation of the same. Fig. 3 shows end elevation of a group or series of six rollers when in their mean position, while Fig. 4 is a similar view after the superstructure has made its maximum movement in one direction.

A is the roller; B, connecting-links; C, the bearing plate or saddle of a superstructure, and D the bed-plate for the same on its foundation.

A' A' in Fig. 2 are recesses in the body of the rollers. A very slight variation in the length of the superstructure, caused by change of temperature, &c., will revolve or move rollers A, and their larger diameter prevents or tends to prevent the bearing-plate C and bed-plates D from being crushed on the lines of pressure. The connecting-links B insure that all the rollers move at the one time.

The rollers may in some cases be placed in a box or frame, or be sunk in masonry, and may also sometimes have a shoulder or groove on their curved edge or end to work in a corresponding groove or shoulder on the bearing-plates, and so tend to prevent lateral movement of the superstructure. For bridges generally I prefer that these rollers should be, say, from eighteen inches to twenty-four inches in diameter, and that the width of their face should be slightly in excess of the maximum amount of movement caused by the expansion and contraction of the superstructure. The length and number of rollers required in each bearing I prefer to calculate by allowing, say, one ton weight on every linear inch of the total length of all the rollers. I prefer the rollers to be of cast-iron, and I sometimes reduce their weight by recessing the flat faces or by coring them out.

Having thus particularly described and ascertained the nature of my said invention and the manner of performing same, I would have it understood that I do not confine myself to any particular dimensions or proportions to or in which my rollers may be made, nor to any particular material of which they may be constructed; but What I believe to be new, and therefore claim as my improvements in bearing-rollers for bridges and other structures, is—

1. A bearing-roller constructed from a cylindrical body by removing a segment thereof from opposite sides of its diametrical axis, for the purpose set forth.

2. A bearing-roller constructed from a cylindrical body by removing a segment thereof from opposite sides of its diametrical axis, said roller having recesses or openings formed in its flat portion, for the purpose specified.

3. A rolling bearing for bridges and other structures, consisting of one or more rollers constructed from a cylindrical body by removing a segment thereof on the opposite sides of its diametrical axis, in combination with such structure and the bed-plate thereof.

4. A rolling bearing consisting of a series of flat rolls constructed from cylindrical bodies by removing a segment thereof on opposite sides of their diametrical axis, in combination with a link or coupling-bar for coupling the rolls together and causing them to move in unison, for the purpose specified.

5. The combination, with a bridge or other structure and the bearing-plate thereof, of a compound rolling bearing composed of a series of flat rolls, A, coupled together and interposed between said bearing-plate and structure for the purpose specified.

JOHN A. McDONALD.

Witnesses:
FRED WALSH,
EDGAR FUSSELL.